(No Model.)
W. BEBERMEYER.
TRACTION WHEEL.
No. 592,683. Patented Oct. 26, 1897.
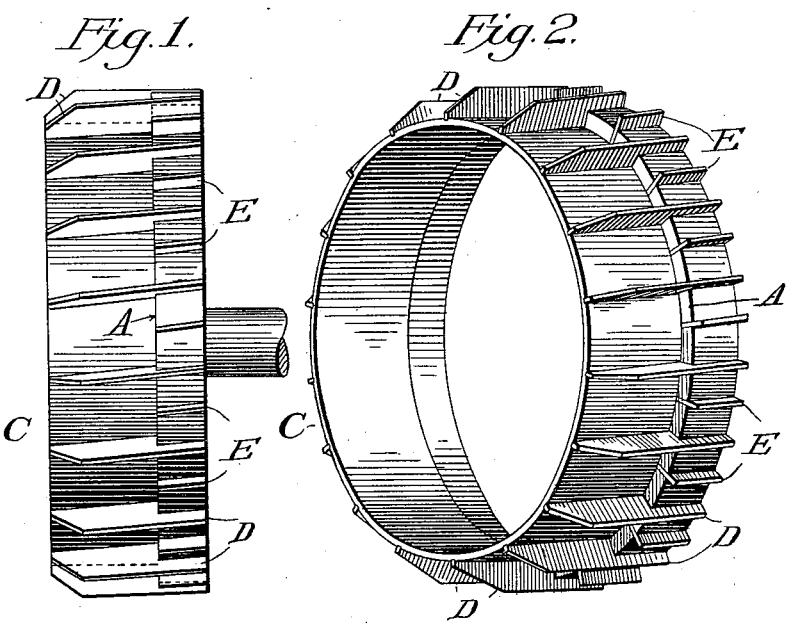
Witnesses.
Inventor.
William Bebermeyer

United States Patent Office.

WILLIAM BEBERMEYER, OF NEAR CASCO, MISSOURI.

TRACTION-WHEEL.

SPECIFICATION forming part of Letters Patent No. 592,683, dated October 26, 1897.

Application filed April 18, 1896. Serial No. 588,208. (No model.)

*To all whom it may concern:*

Be it known that I, WILLIAM BEBERMEYER, of near Casco, in the county of Franklin and State of Missouri, have invented a new and useful Improvement in Traction-Wheels for Traction-Engines or Mowers, Binders, Reapers, and other Farm Implements; and I do hereby declare that the following is a full, clear, and exact description of the same.

This invention is an improvement in traction-wheels, the object of the same being to provide a wheel of this character which is adapted for travel over hard and soft ground, entering the soil to a more or less extent, according to the condition of the same.

The invention contemplates a particular construction of the rim of the wheel by which a comparatively narrow tread-surface is presented for travel over comparatively hard ground, while a broad tread-surface is brought into play to form an increased bearing when traveling over soft ground or plowed fields.

To the accomplishment of the above objects the invention consists in the particular construction of the rim and arrangement of the cleats thereon fully described in the following specification and specifically set forth in the appended claim.

In the drawings forming part of this specification, Figure 1 is an edge view of my improved traction-wheel or rim therefor. Fig. 2 is a perspective view of the rim.

In carrying out my invention the traction-wheel is provided with a very wide rim, at one edge of which is formed a projecting flange A, presenting a flat raised surface which is narrow compared with the depressed major portion C of said rim. From the raised surface or projecting flange A project a peripheral series of plates or cleats E, extending transversely and at a slight angle with respect to said rim. A second set of projecting cleats D project from the depressed portion C of the rim and are extended across the raised surface or flange between the cleats E thereon, thereby increasing the number of cleats on said raised surface. The cleats E and D extend to the same extent, the outer edges being on a line around the rim.

In use the wheel when traveling over comparatively hard ground will have a bearing only upon the narrow raised surface or flange A, with the cleats D and E entering the ground to give the proper hold, the former not entering to their fullest extent. When the wheel is moving over very soft ground, the flange A will enter and permit the depressed surface C to bear upon the ground, presenting a greatly-increased bearing for the wheel, and also increasing the effectiveness of the cleats D, the said flange then acting to prevent the wheel slipping laterally.

The outer ends of the cleats D are beveled, as shown.

It will be noted that by forming the cleats on the depressed portion of the rim in the manner shown they will not fill up or become clogged.

Having thus described my invention, what I claim as new, and desire to secure by Letters Patent, is—

A traction-wheel having a wide rim provided at its inner edge with a raised portion or flange presenting a flat surface above the plane of the major portion of said rim, transverse plates or cleats projecting from the flange or raised surface of the rim, and a second set of cleats projecting from the wider or depressed portion of the rim and extended over the raised portion between the cleats thereon, all the cleats being of the same height and the longer cleats beveled at their inner ends, as herein shown and described.

WILLIAM BEBERMEYER.

Witnesses:
 LOUIS F. PUES,
 W. E. ANDERSON.